(12) United States Patent
Otsu

(10) Patent No.: US 12,741,497 B2
(45) Date of Patent: Sep. 22, 2026

(54) DAMPER ROD MOUNT

(71) Applicant: Prospira Corporation, Kawasaki city (JP)

(72) Inventor: Kazutaka Otsu, Kawasaki city (JP)

(73) Assignee: Prospira Corporation, Kawasaki city (JP)

( * ) Notice: Subject to any disclaimer, the term of this patent is extended or adjusted under 35 U.S.C. 154(b) by 0 days.

(21) Appl. No.: 19/112,595

(22) PCT Filed: Jul. 25, 2023

(86) PCT No.: PCT/JP2023/027281

§ 371 (c)(1), (2) Date: Mar. 18, 2025

(87) PCT Pub. No.: WO2024/070176

PCT Pub. Date: Apr. 4, 2024

(65) Prior Publication Data

US 2026/0116135 A1 Apr. 30, 2026

(30) Foreign Application Priority Data

Sep. 29, 2022 (JP) ................................ 2022-157035

(51) Int. Cl.
*B60G 13/00* (2006.01)
*F16F 1/32* (2006.01)

(52) U.S. Cl.
CPC ............ *B60G 13/003* (2013.01); *F16F 1/328* (2013.01); *B60G 2204/128* (2013.01); *B60G 2204/41* (2013.01); *B60G 2204/45021* (2013.01); *B60G 2206/73* (2013.01)

(58) Field of Classification Search
CPC ................. B60G 15/06; B60G 13/003; B60G 2204/128; B60G 2204/41; F16F 1/18; F16F 9/54; F16F 15/06
USPC .................................... 267/220; 280/124.155
See application file for complete search history.

(56) References Cited

U.S. PATENT DOCUMENTS

| | | | | |
|---|---|---|---|---|
| 5,676,355 A * | 10/1997 | Hayashi | .................... | F16F 9/38 267/221 |
| 8,939,439 B2 * | 1/2015 | Corbett | ................ | B60G 15/068 384/609 |
| 2022/0307570 A1 * | 9/2022 | Kadowaki | ............. | F16F 1/3828 |

FOREIGN PATENT DOCUMENTS

| | | | |
|---|---|---|---|
| CN | 113775689 A * | 12/2021 | ............. B08B 17/06 |
| CN | 115451054 A * | 12/2022 | ................ F16F 9/36 |
| JP | H0198709 U | 7/1989 | |
| JP | H04107337 A | 4/1992 | |
| JP | 2009085300 A | 4/2009 | |

(Continued)

OTHER PUBLICATIONS

Computer generated English translation of CN 113775689 (Year: 2021).*

(Continued)

*Primary Examiner* — Jason D Shanske
*Assistant Examiner* — Tiffany L Webb
(74) *Attorney, Agent, or Firm* — KENJA IP LAW PC

(57) ABSTRACT

A damper rod mount (1A) is configured to connect a damper rod and a vehicle body. The mount (1A) is formed as a metal plate spring. The mount (1A) comprises: a center portion (2) configured to have the damper rod attached thereto; a ring portion (3) surrounding the center portion (2); and a plurality of arm portions (4) each connecting the center portion (2) and the ring portion (3).

8 Claims, 7 Drawing Sheets

(56) References Cited

FOREIGN PATENT DOCUMENTS

| | | | | |
|---|---|---|---|---|
| JP | 2015031243 A | 2/2015 | | |
| KR | 100345124 B1 * | 7/2002 | ............. | B60G 7/005 |

OTHER PUBLICATIONS

Computer generated English translation of CN 115451054 (Year: 2022).*

Computer generated English translation of KR 100345124 (Year: 2002).*

Oct. 17, 2023, International Search Report issued in the International Patent Application No. PCT/JP2023/027281.

Mar. 1, 2025, International Preliminary Report on Patentability issued in the International Patent Application No. PCT/JP2023/027281.

* cited by examiner

DAMPER ROD MOUNT

TECHNICAL FIELD

The present disclosure relates to a damper rod mount. The present application claims priority to and the benefit of Japanese Patent Application No. 2022-157035 filed Sep. 29, 2022, the entire contents of which are incorporated herein by reference.

BACKGROUND

Conventional damper rod mounts are known to be composed of a composite spring that combines a metal spring and a rubber elastic body in order to achieve both high vibration damping performance at low frequencies and good micro-vibration absorption performance at high frequencies (see, for example, Patent Literature (PTL) 1).

CITATION LIST

Patent Literature

PTL 1: JP 2009-85300 A

SUMMARY

Technical Problem

The foregoing conventional damper rod mounts have a structure in which input caused by irregular movement of the damper rod (piston rod) is absorbed by the rubber elastic body. The conventional damper rod mounts therefore require peripheral members (e.g. inner members, upper and lower plates) to attach the rubber elastic body to the damper rod together with the metal plate spring. Such rubber elastic body and peripheral members increase the number of parts and the number of assembly steps, thus causing a cost increase.

It could therefore be helpful to provide a damper rod mount that can reduce the number of parts and absorb input caused by irregular movement of the damper rod.

Solution to Problem (1) A damper rod mount according to the present disclosure is a damper rod mount configured to connect a damper rod and a vehicle body and formed as a metal plate spring, the damper rod mount comprising: a center portion configured to have the damper rod attached thereto; a ring portion surrounding the center portion; and a plurality of arm portions each connecting the center portion and the ring portion. The damper rod mount according to the present disclosure can reduce the number of parts and absorb input caused by irregular movement of the damper rod.

(2) In the damper rod mount according to (1), the arm portion preferably includes a curved portion that curves downward. In this case, input caused by irregular movement of the damper rod can be absorbed more effectively.

(3) In the damper rod mount according to (1) or (2), at least one of the center portion and the arm portion may have an opening. Thus, input caused by irregular movement of the damper rod can be absorbed more effectively.

(4) The damper rod mount according to any one of (1) to (3) may further comprise a highly viscoelastic member covering at least one of an upper surface and a lower surface of the arm portion. In this case, the damper rod mount can be prevented from resonance.

(5) The damper rod mount according to (4) may further comprise a flexible member covering the highly viscoelastic member. In this case, the damper rod mount can be further prevented from resonance.

(6) The damper rod mount according to any one of (1) to (5) may further comprise: a stopper provided on at least one of an upper surface and a lower surface of the arm portion; and a stopper receiving portion capable of contacting the stopper. In this case, the damper rod mount can suppress excessive strokes that are likely to occur in the up-down direction.

(7) In the damper rod mount according to any one of (1) to (6), the plurality of arm portions may be three or four arm portions. In this case, it is possible to reduce the number of parts and absorb input caused by irregular movement of the damper rod by a relatively simple structure.

Advantageous Effect

It is thus possible to provide a damper rod mount that can reduce the number of parts and absorb input caused by irregular movement of the damper rod.

DETAILED DESCRIPTION

Damper rod mounts according to various embodiments of the present disclosure will be described below with reference to the drawings. In the description below, the following definitions will be used and the substantially same parts will be given the same reference signs.

The terms “upper” or “up”, “lower” or “down”, “front”, “rear”, “left”, and “right” are based on the state in which the damper rod mount is disposed on the vehicle. Reference sign O1 is the center axis of the damper rod mount. The extending direction of the center axis O1 of the damper rod mount (hereafter also simply referred to as “center axis O1”) is also referred to as the axial direction, and may coincide with the up-down direction. A direction perpendicular to the extending direction of the center axis O1 is also referred to as the radial direction. The side closer to the center axis O1 in the radial direction is also referred to as the radial inner side, and the side farther from the center axis O1 in the radial direction is also referred to as the radial outer side. The expression “initial state of the damper rod mount” refers to the state of the damper rod mount when the vehicle is stopped.

Figure 1:
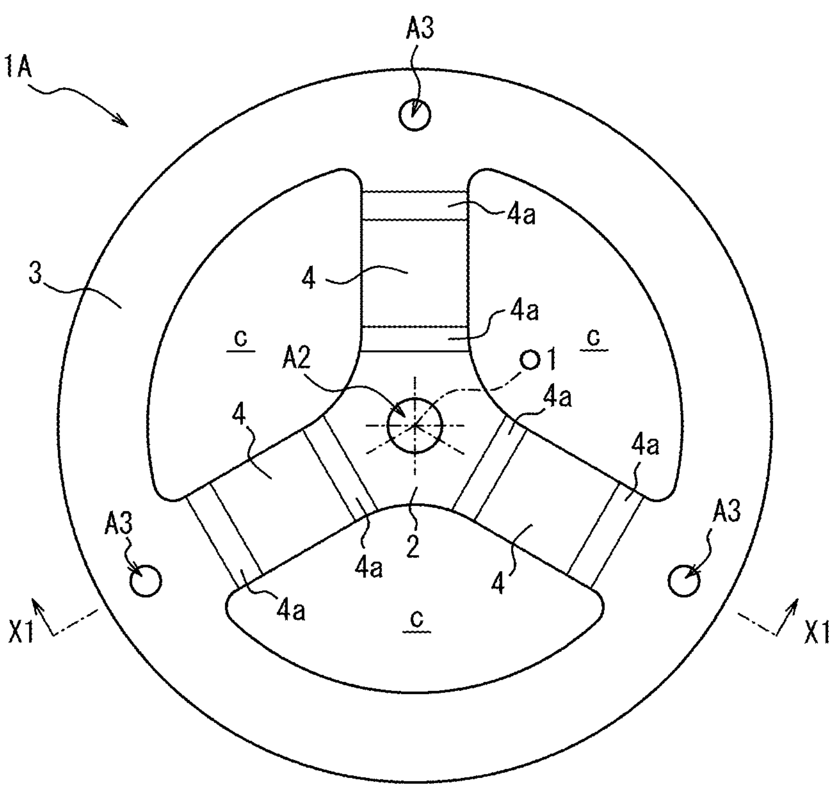
FIG. 1 is a plan view schematically illustrating a damper rod mount according to Embodiment 1 of the present disclosure.
Figure 2:
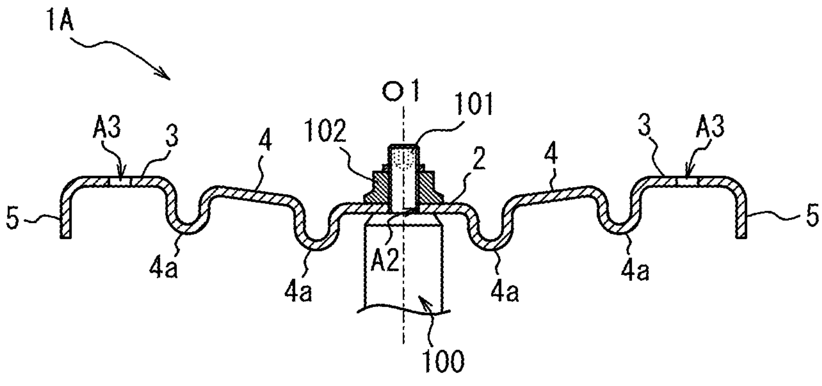
FIG. 2 is a sectional view schematically illustrating the state of fastening between the damper rod mount in FIG. 1 and a damper rod, in section X1-X1 in FIG. 1.

FIG. 1 illustrates a damper rod mount 1A according to Embodiment 1 of the present disclosure as seen from above. FIG. 2 illustrates section X1-X1 in FIG. 1. Section X1-X1 is a plane that includes the center axis O1 and passes through two arm portions 4 described later.

The damper rod mount 1A (hereafter also simply referred to as “mount 1A”) connects a damper rod and a vehicle body (not illustrated). The mount 1A is formed as a metal plate spring, as illustrated in FIG. 2.

In this embodiment, the mount 1A is made of spring steel. For example, spring steel material (SUP material) specified in JIS G 4801 may be used as the spring steel. Other spring steel materials, such as SUS spring material specified in JIS G 4313, may also be used. Thus, in this embodiment, the material of the mount 1A is not limited as long as the mount 1A is made of a metal that enables functioning as a plate spring.

With reference to FIG. 1, the mount 1A includes a center portion 2 to which a damper rod 100 is to be attached. In this embodiment, the center portion 2 has a mounting hole A2 for mounting the damper rod. In this embodiment, the mounting hole A2 is a through hole formed through the center portion 2 in the axial direction, as illustrated in FIG. 2. In this embodiment, the damper rod 100 is fixed to the mount 1A as a result of its tip pin 101 being inserted through the mounting hole A2 and tightened with a nut 102. In this embodiment, the center axis of the center portion 2 (mounting hole A2) coincides with the center axis O1.

With reference to FIG. 1, the mount 1A also includes a ring portion 3 surrounding the center portion 2. The center portion 2 and the ring portion 3 are spaced apart in the radial direction. In this embodiment, the center axis of the ring portion 3 coincides with the center axis O1, too. In this embodiment, the ring portion 3 has mounting holes A3 for mounting the vehicle body. In this embodiment, the mounting holes A3 are through holes formed through the ring portion 3 in the axial direction, as illustrated in FIG. 2. In this embodiment, the mount 1A is fixed to the vehicle body by, for example, fastening elements such as bolts inserted through the mounting holes A3. In this embodiment, for example, the ring portion 3 has three mounting holes A3 as illustrated in FIG. 1. In this embodiment, the radial outer edge of the ring portion 3 is connected to a sidewall portion 5 that surrounds a tamper spring (not illustrated). The sidewall portion 5 extends in a ring shape in the circumferential direction around the center axis O1 together with the radial outer edge of the ring portion 3. In this embodiment, the sidewall portion 5 extends downward from the radial outer edge of the ring portion 3, as illustrated in FIG. 2.

With reference to FIG. 1, the mount 1A further includes a plurality of arm portions 4 each connecting the center portion 2 and the ring portion 3. The plurality of arm portions 4 extend radially from the center portion 2. A gap C is formed between arm portions 4 adjacent in the circumferential direction around the center axis O1. In detail, the gap C is defined by the adjacent arm portions 4, the center portion 2, and the ring portion 3. In this embodiment, the center portion 2 and the ring portion 3 are flat (horizontal) parts extending in the radial direction, whereas the arm portions 4 extend so as to incline downward from the ring portion 3 toward the center portion 2 in the initial state of the mount 1A, as illustrated in FIG. 2. In other words, in this embodiment, the mount 1A has a tapered outer shape that inclines toward the center axis O1 in the downward direction, with the horizontal ring portion 3 and the horizontal center portion 2 that is located radially inward from the ring portion 3 and also located lower than the ring portion 3 being connected by the plurality of arm portions 4. Thus, the mount 1A is formed as a metal plate spring, and is composed of the center portion 2 to which the damper rod 100 is to be attached, the ring portion 3 surrounding the center portion 2, and the plurality of arm portions 4 each connecting the center portion 2 and the ring portion 3.

In this embodiment, each arm portion 4 includes curved portions 4*a* that curve downward, as illustrated in FIG. 2. With reference to FIG. 2, in this embodiment, each curved portion 4*a* has an inverted U-shaped cross section in which part of the arm portion 4 is bent downward and then bent upward. In this embodiment, the curved portion 4*a* extends in a direction perpendicular to the extending direction of the arm portion 4 in a plan view as illustrated in FIG. 1. In this embodiment, each arm portion 4 includes a plurality of curved portions 4*a* spaced apart in the radial direction. Specifically, each arm portion 4 includes two curved portions 4*a*. In this embodiment, one of the two curved portions 4*a* is located closer to the center portion 2 than to the ring portion 3, whereas the other of the two curved portions 4*a* is located closer to the ring portion 3 than to the center portion 2.

Figure 3A:
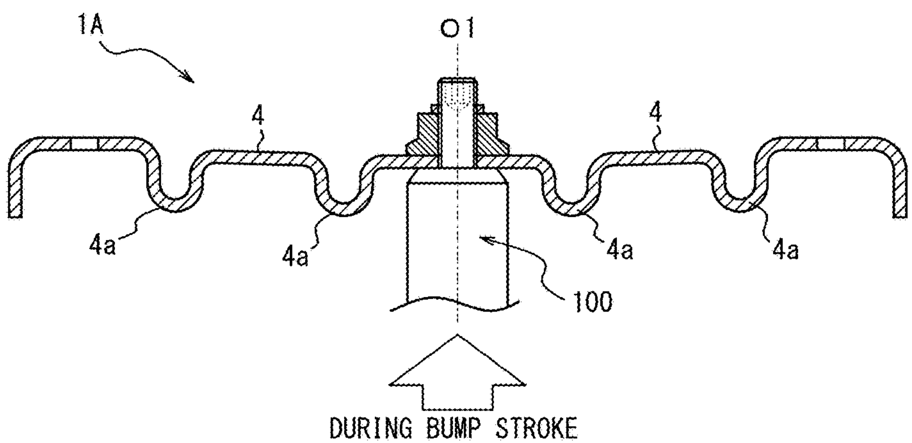
FIG. 3A is a sectional view schematically illustrating the state of the damper rod mount in FIG. 1 during a bump stroke, in section X1-X1 in FIG. 1.

FIG. 3A schematically illustrates the state of the mount 1A during a bump stroke, in section X1-X1. As illustrated in FIG. 3A, when the wheel approaches the vehicle body, the mount 1A can absorb the input caused by the upward movement of the damper rod as a result of the arm portions 4 deforming.

Figure 3B:
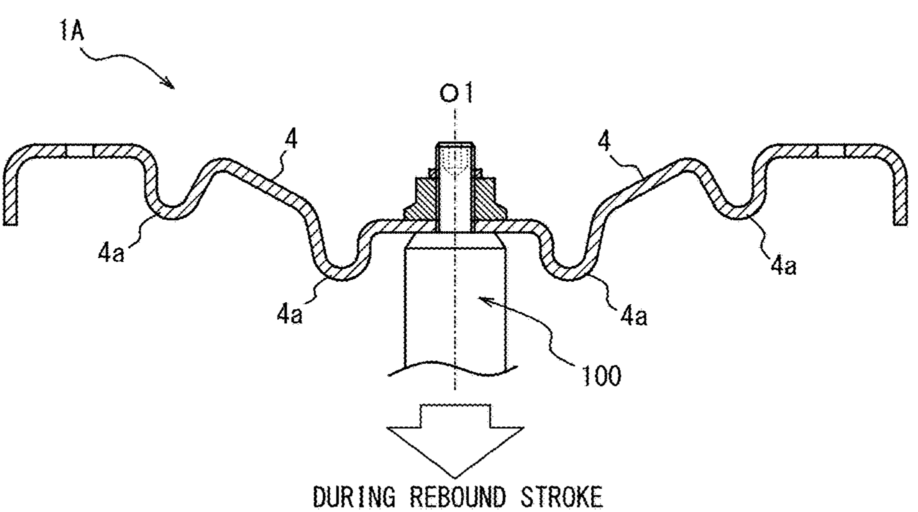
FIG. 3B is a sectional view schematically illustrating the state of the damper rod mount in FIG. 1 during a rebound stroke, in section X1-X1 in FIG. 1.

FIG. 3B schematically illustrates the state of the mount 1A during a rebound stroke, in section X1-X1. As illustrated in FIG. 3B, when the wheel separates from the vehicle body, the mount 1B can absorb the input caused by the downward movement of the damper rod as a result of the arm portions 4 deforming.

Figure 3C:
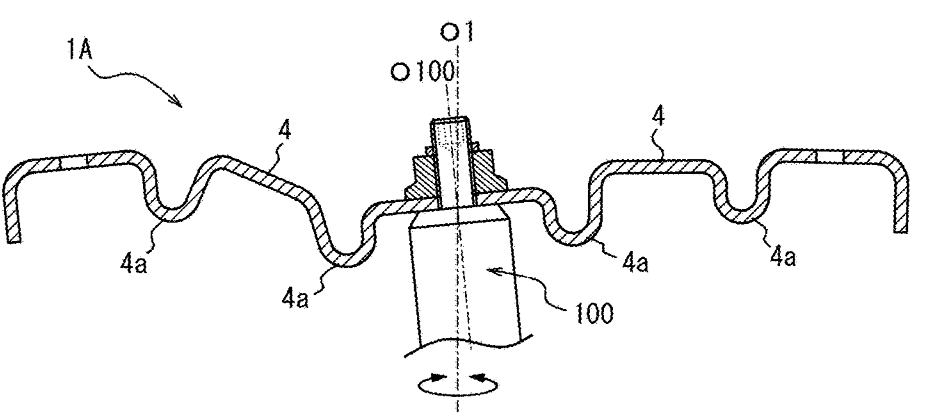
FIG. 3C is a sectional view schematically illustrating the state of the damper rod mount in FIG. 1 when the damper rod moves irregularly, in section X1-X1 in FIG. 1.

FIG. 3C schematically illustrates the state of the mount 1A when the damper rod moves irregularly, in section X1-X1 in FIG. 1. As illustrated in FIG. 3C, when the damper rod 100 moves irregularly, the mount 1A can absorb the input force associated with the movement as a result of the arm portions 4 deforming. Specifically, in FIG. 3C, the arm portions 4 facing each other across the center axis O1 are displaced in opposite phases, thus absorbing the input force associated with the twisting of the damper rod 100. Here, the “twisting of the damper rod 100” refers to the damper rod 100 rotating around the center axis O1 of the mount 1A in a state in which the center axis O100 of the damper rod 100 is inclined relative to the center axis O1 of the mount 1A.

The mount 1A is composed of a single plate spring. Hence, the number of parts and the number of assembly steps for the damper rod mount can be reduced compared to conventional damper rod mounts that combine a metal spring and a rubber elastic body.

Thus, the mount 1A can reduce the number of parts and the number of assembly steps and absorb input caused by irregular movement of the damper rod.

In particular, in this embodiment, each arm portion 4 includes curved portions 4*a* that curve downward. Specifically, each curved portion 4*a* has an inverted U-shape that protrudes downward. In this case, opening and closing (expanding and contracting) the curved portion 4*a* in the radial direction can change the radial length of the arm portion 4 more greatly. In other words, in this embodiment, the mount 1A can be changed more greatly between the center portion 2 and the ring portion 3 by the curved portion 4*a*. In this case, input from the damper rod 100, especially input caused by irregular movement of the damper rod 100, can be absorbed more effectively. In particular, in this embodiment, one of the two curved portions 4*a* is located closer to the center portion 2, and the other of the two curved portions 4*a* is located closer to the ring portion 3. This can alleviate stress concentration that is likely to occur at the part of connection between the center portion 2 and the arm portion 4 and the part of connection between the ring portion 3 and the arm portion 4. In this embodiment, each arm portion 4 includes a plurality of curved portions 4*a*. By increasing or decreasing the number of curved portions 4*a*, it is possible to adjust the amount of change in the radial length of the arm portion 4. In the present disclosure, however, the number of curved portions 4*a* is at least one.

Figure 4:
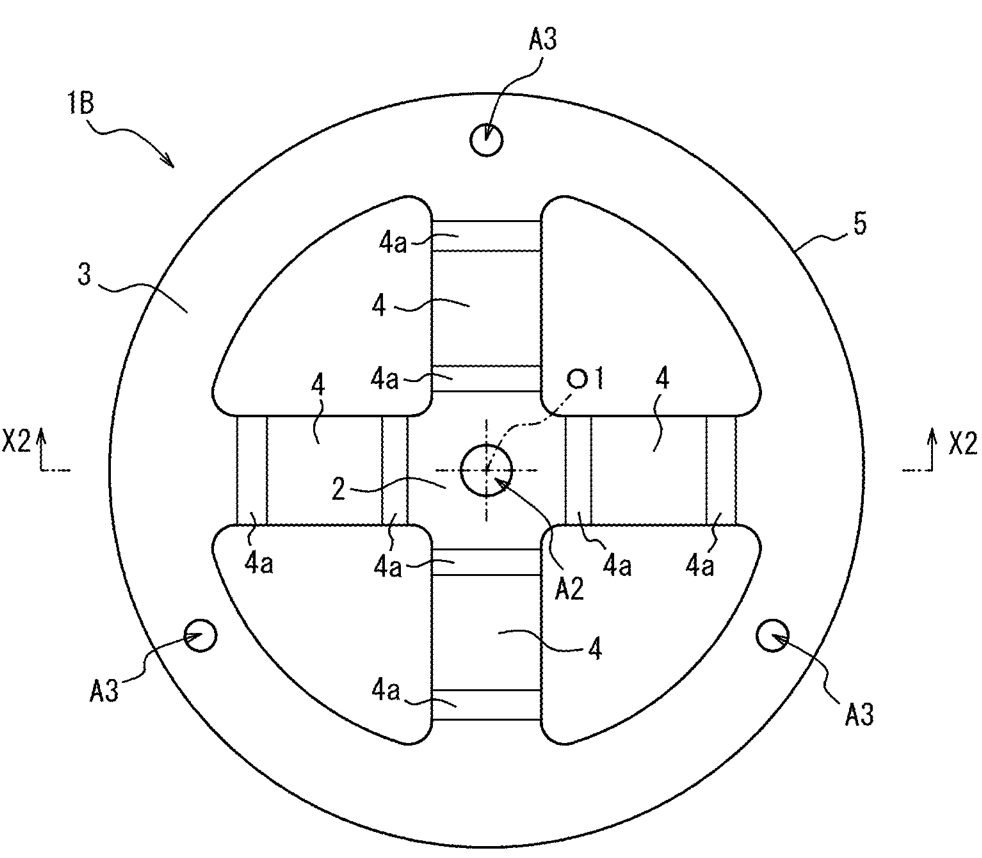
FIG. 4 is a plan view schematically illustrating a damper rod mount according to Embodiment 2 of the present disclosure.
Figure 5:
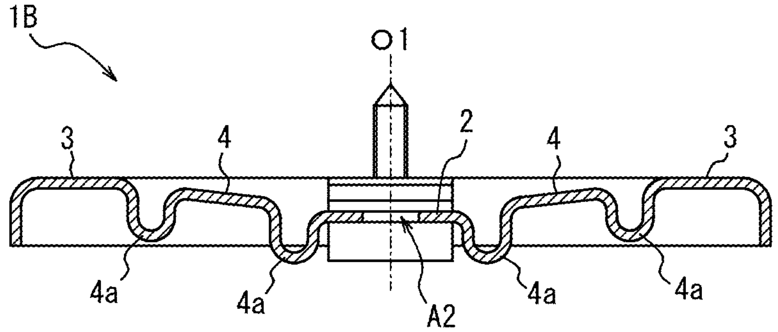
FIG. 5 is a sectional view schematically illustrating the damper rod mount in FIG. 4, in section X2-X2 in FIG. 4.

The number of arm portions 4 may be four. FIG. 4 schematically illustrates a damper rod mount 1B (hereafter also referred to as "mount 1B") according to Embodiment 2 of the present disclosure as seen from above. FIG. 5 schematically illustrates the mount 1B in section X2-X2 in FIG. 4. While the mount 1A according to Embodiment 1 includes three arm portions 4, the mount 1B according to this embodiment includes four arm portions 4. The mount 1B can achieve the same function as the mount 1A. In other words, the mounts 1A and 1B can each reduce the number of parts and absorb input caused by irregular movement of damper rod 100 by a relatively simple structure. The number of arm portions 4 can be two or more.

In the present disclosure, instead of providing the curved portion 4*a* in the arm portion 4, an opening may be provided in at least one of the center portion 2 and the arm portion 4. In this case, input from the damper rod 100, especially input caused by irregular movement of the damper rod 100, can be absorbed more effectively, as in the case where the curved portion 4*a* is provided in the arm portion 4.

Figure 6:
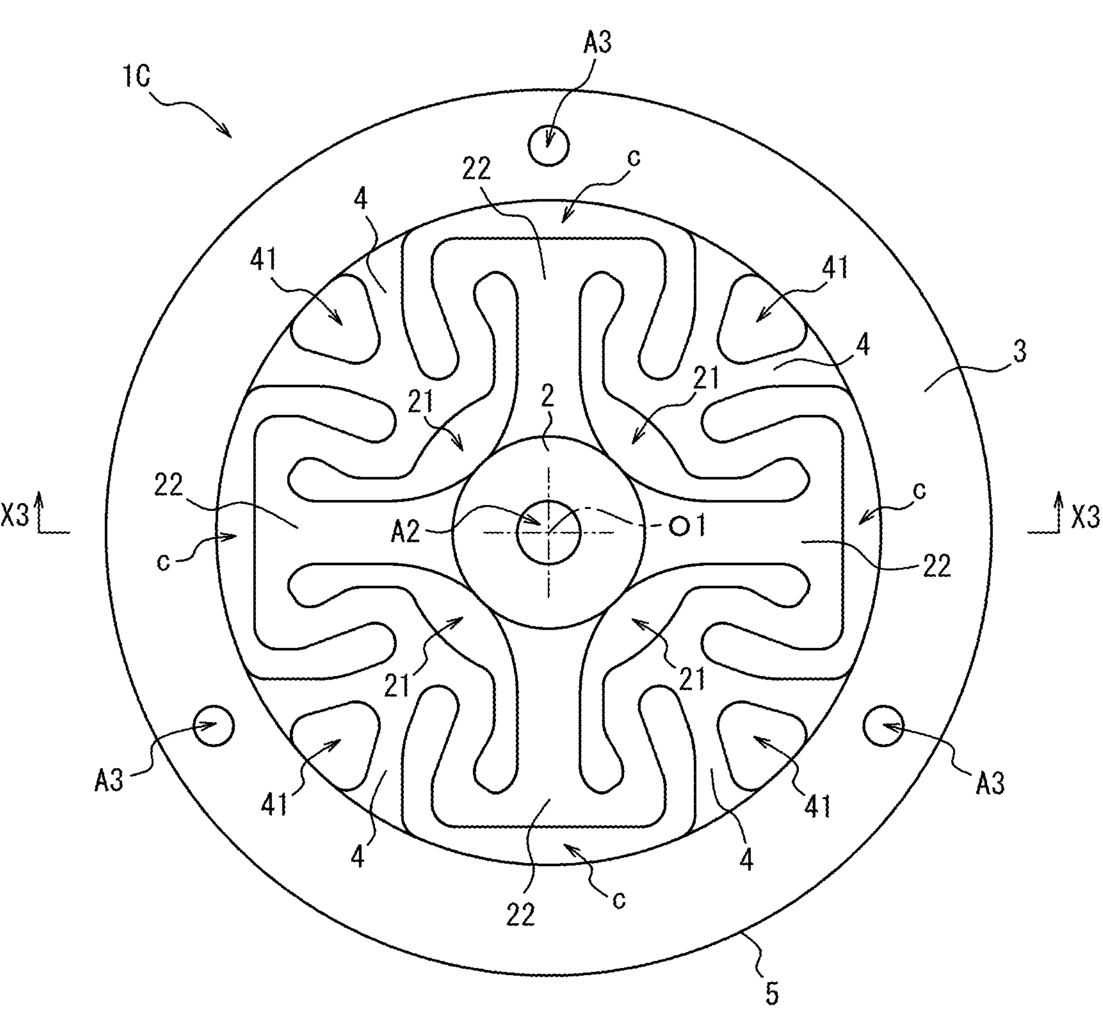
FIG. 6 is a plan view schematically illustrating a damper rod mount according to Embodiment 3 of the present disclosure.
Figure 7:
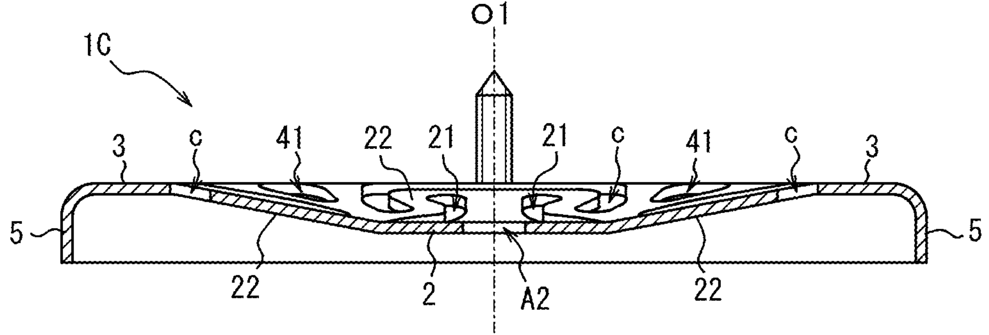
FIG. 7 is a sectional view schematically illustrating the damper rod mount in FIG. 6, in section X3-X3 in FIG. 6.

FIG. 6 schematically illustrates a damper rod mount 1C (hereafter also referred to as "mount 1C") according to Embodiment 3 of the present disclosure as seen from above. FIG. 7 schematically illustrates the state of fastening between the mount 1C and the damper rod 100, in section X3-X3 in FIG. 6.

The mount 1C includes openings 21 and 41 respectively in the center portion 2 and the arm portion 4, at positions different from the mounting holes A2 and A3. With reference to FIG. 6, in this embodiment, the center portion 2 includes a protruding portion 22 that protrudes into a gap C formed between arm portions 4 adjacent in the circumferential direction around the center axis O1. In this embodiment, the opening 21 is formed in the protruding portion 22. In this embodiment, the opening 21 extends across the radial inner side of the arm portion 4 in the circumferential direction toward the protruding portions 22 located on both sides of the arm portion 4 in the circumferential direction, in a plan view as illustrated in FIG. 6. The mount 1C includes four openings 21, as an example. With reference to FIG. 6, in this embodiment, the opening 41 is formed in the arm portion 4. In this embodiment, the opening 21 is located on the radial outer side of the arm portion 4 as illustrated in FIG. 6. As illustrated in FIG. 7, the opening 21 is a through hole formed through the protruding portion 22 in the axial direction, and the opening 41 is a through hole formed through the arm portion 4 in the axial direction.

The mount 1C, too, can be changed more greatly between the center portion 2 and the ring portion 3 by the openings 21 and 41 provided respectively in the protruding portion 22 of the center portion 2 and in the arm portion 4. In this case, input from the damper rod 100, especially input caused by irregular movement of the damper rod 100, can be absorbed more effectively, as in the case where the curved portion 4*a* is provided in the arm portion 4.

Metal springs have low vibration damping. Accordingly, in the case where the damper rod mount is formed only of a metal spring as in the present disclosure, there is a concern that, when vibration is input to the damper rod mount, the damper rod mount resonates with the input vibration and as a result generates noise.

In view of this, the damper rod mount according to the present disclosure may further include a highly viscoelastic member 6 covering at least one of the upper and lower surfaces of the arm portion 4. In the present disclosure, the highly viscoelastic member 6 may cover the whole or part of at least one of the upper and lower surfaces of the arm portion 4. This can suppress the resonance of the damper rod mount. The highly viscoelastic member 6 is made of a material having higher viscoelasticity than the damper rod mount according to the present disclosure. The highly viscoelastic material is, for example, a material with loss tangent (loss coefficient) tan $\delta$ of 0.2 or more as viscoelastic property. A specific example is butyl rubber (IIR).

The damper rod mount according to the present disclosure may further include a flexible member 7 covering the highly viscoelastic member 6. In the present disclosure, the flexible member 7 covers the whole or part of the highly viscoelastic member 6. This can further suppress the resonance of the damper rod mount. The flexible member 7 is made of a material having high flexibility greater than or equal to that of the metal spring forming the damper rod mount according to the present disclosure. The highly flexible material is, for example, a material with loss tangent (loss factor) tan $\delta$ of 0.2 or more as viscoelastic property. A specific example is butyl rubber (IIR).

Figure 8:
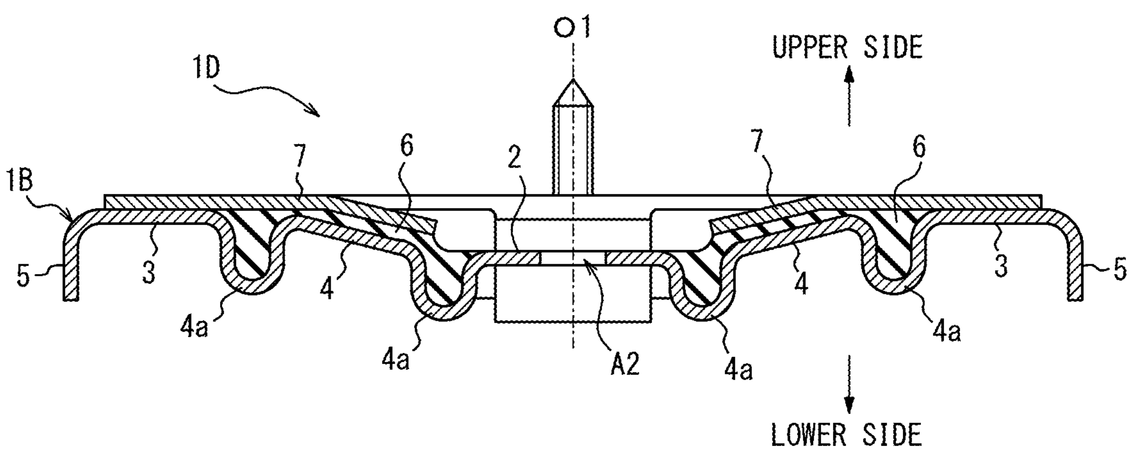
FIG. 8 is a sectional view schematically illustrating a damper rod mount according to Embodiment 4 of the present disclosure.

FIG. 8 schematically illustrates a damper rod mount 1D (hereafter also referred to as "mount 1D") according to Embodiment 4 of the present disclosure, in a section including the center axis O1.

The mount 1D includes the mount 1B as a base, as an example. In the mount 1D, the upper surface of the mount 1B is covered with a highly viscoelastic member 6. In this embodiment, the highly viscoelastic member 6 covers the whole upper surface of the arm portion 4. The highly viscoelastic member 6 is joined to the upper surface of the arm portion 4 by, for example, adhesion. In this case, the highly viscoelastic member 6 deforms following the movement of the arm portion 4. This increases vibration damping of the mount 1B compared to when there is only the mount 1B. Thus, covering the mount 1B with the highly viscoelastic member 6 can prevent the mount 1B from resonance.

Moreover, in this embodiment, a flexible member 7 is located above the mount 1B. In this embodiment, the flexible member 7 is a plate member extending in the radial direction as illustrated in FIG. 8. In this embodiment, a gap in which the highly viscoelastic member 6 is placed is formed between the flexible member 7 and the arm portion 4. In this embodiment, the radial outer part of the flexible member 7 is joined to the ring portion 3. Meanwhile, the gap is formed between the radial inner part of the flexible member 7 and the arm portion 4. In this embodiment, the highly viscoelastic member 6 is joined to the upper surface of the arm portion 4 and the lower surface of the flexible member 7 by, for example, adhesion. In this embodiment, the flexible member 7 covers part of the upper surface of the highly viscoelastic member 6. Specifically, the flexible member 7 covers the arm portion 4 from the ring portion 3 side excluding the curved portion 4*a* on the center portion 3 side.

Figure 9A:
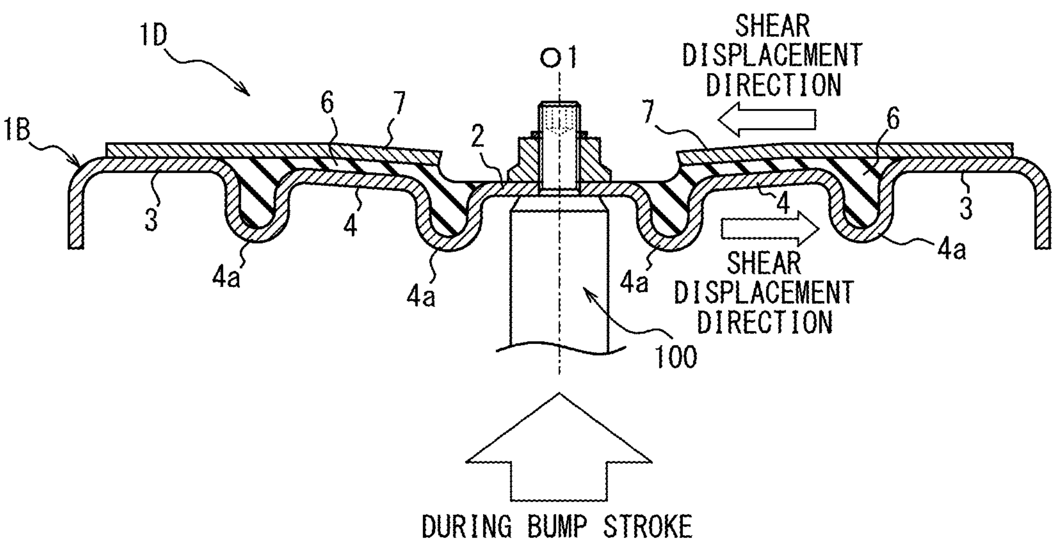
FIG. 9A is a sectional view schematically illustrating the state of the damper rod mount in FIG. 8 during a bump stroke.
Figure 9B:
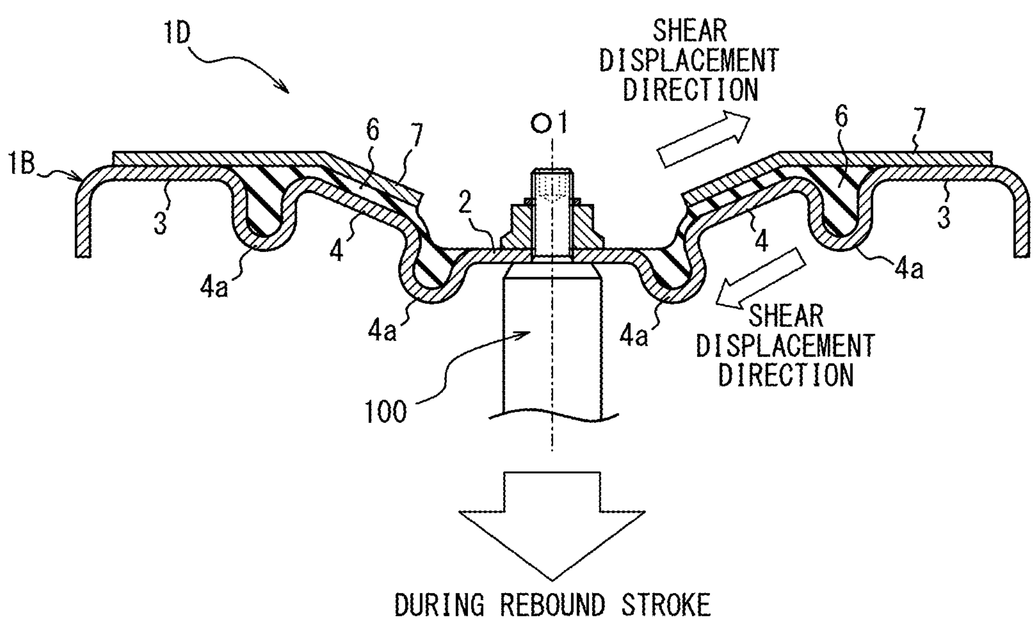
FIG. 9B is a sectional view schematically illustrating the state of the damper rod mount in FIG. 1 during a rebound stroke.

FIG. 9A schematically illustrates the state of the mount 1D during a bump stroke, in a section equivalent to section X2-X2. FIG. 9B schematically illustrates the state of the mount 1D during a rebound stroke, in a section equivalent to section X2-X2. As illustrated in FIGS. 9A and 9B, when the mount 1D is subjected to a stroke, the highly viscoelastic member 6 bends together with the flexible member 7 while following the arm portion 4, thus undergoing shear deformation in the radial direction between the arm portion 4 and the flexible member 7. This increases vibration damping of the mount 1B compared to when there is only the mount 1B. Thus, with the structure of the mount 1D, the damper rod mount can be further prevented from resonance. The base of the mount 1D may be, instead of the mount 1B, another damper rod mount according to the present disclosure composed of only a metal spring, such as the mount 1A or 1C.

The damper rod mount according to the present disclosure may further include a stopper 8 provided on at least one of the upper and lower surfaces of the arm portion 4 and a stopper receiving portion 9 capable of contacting the stopper 8. In this case, the damper rod mount can suppress excessive strokes that are likely to occur in the up-down direction.

Figure 10:
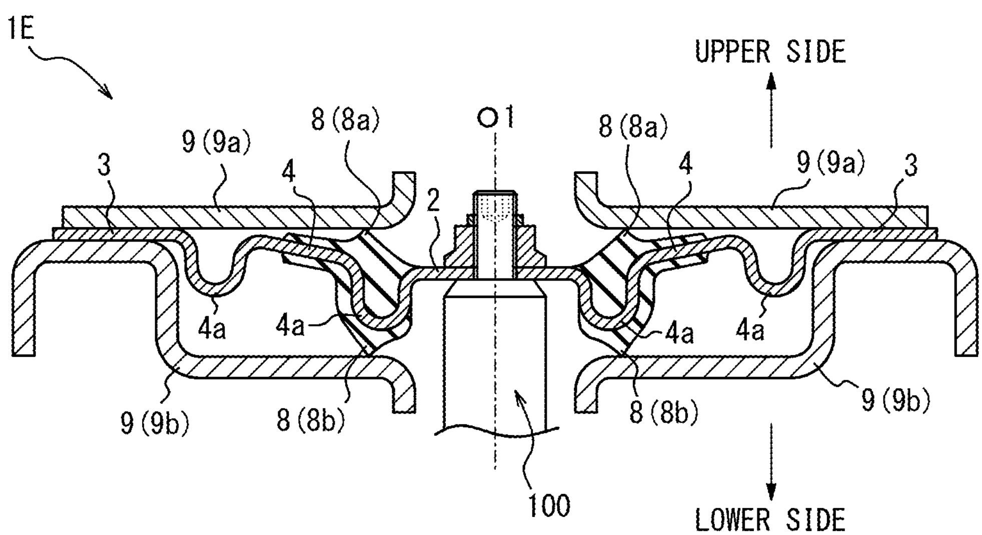
FIG. 10 is a sectional view schematically illustrating the state of fastening between a damper rod mount according to Embodiment 5 of the present disclosure and a damper rod.

FIG. 10 schematically illustrates the state of fastening between a damper rod mount 1E according to Embodiment 5 of the present disclosure and a damper rod 100, in a section including the center axis O1.

The mount 1E includes, for example, the mount 1B from which the sidewall portion 5 has been removed, as a base. In this embodiment, the stopper 8 is located on the radial inner side of the arm portion 4. The stopper 8 is made of an elastic material such as rubber or resin, for example. In this embodiment, the stopper receiving portion 9 is made of metal, for example. In this embodiment, the stopper receiving portion 9 is joined to the ring portion 3.

In detail, in FIG. 10, reference sign 8*a* is an upper stopper provided on the upper surface of the arm portion 4. The upper stopper 8*a* protrudes upward from the upper surface of the arm portion 4. Reference sign 9*a* is an upper stopper receiving portion disposed above the upper stopper 8*a*. For example, in the event of an excessive bump stroke, the upper stopper 8*a* can suppress the excessive bump stroke by contacting the upper stopper receiving portion 9*a*.

In FIG. 10, reference sign 8*b* is a lower stopper provided on the lower surface of the arm portion 4. The lower stopper 8*b* protrudes downward from the lower surface of the arm portion 4. Reference sign 9*b* is a lower stopper receiving portion disposed below the lower stopper 8*b*. For example, in the event of an excessive rebound stroke, the lower stopper 8*b* can suppress the excessive rebound stroke by contacting the lower stopper receiving portion 9*b*.

Thus, the mount 1E can suppress excessive strokes that are likely to occur in the up-down direction.

The above merely discloses some embodiments of the damper rod mount according to the present disclosure in which a center portion that is attachable to a damper rod and a ring portion that is attachable to a vehicle body are connected by a plurality of arms, and various modifications are possible within the scope of the claims. The various structures used in the above embodiments may be used in combination. In the embodiments, the curved portions 4*a* or the openings 21 and 41 are used to make the arm portion 4 move easily between the center portion 2 and the ring portion 3. Alternatively, the elastic modulus of the arm portion 4 may be locally reduced, for example, the thickness of the arm portion 4 may be locally reduced, to make the arm portion 4 move easily between the center portion 2 and the ring portion 3.

REFERENCE SIGNS LIST

1A damper rod mount (Embodiment 1)
1B damper rod mount (Embodiment 2)
1C damper rod mount (Embodiment 3)
1D damper rod mount (Embodiment 4)
1E damper rod mount (Embodiment 5)
2 center portion
21 opening
22 protruding portion of center portion
3 ring portion
4 arm portion
4*a* curved portion
41 opening
5 side wall portion
6 highly viscoelastic member
7 flexible member
8 stopper
8*a* upper stopper
8*b* lower stopper
9 stopper receiving portion
9*a* upper stopper receiving portion
9*b* lower stopper receiving portion

The invention claimed is:

1. A damper rod mount configured to connect a damper rod and a vehicle body and formed as a metal plate spring, the damper rod mount comprising:
- a center portion configured to have the damper rod attached thereto;
- a ring portion surrounding the center portion;
- a plurality of arm portions each connecting the center portion and the ring portion;
- a highly viscoelastic member covering at least one of an upper surface and a lower surface of each of the plurality of arm portions; and
- a flexible member covering the highly viscoelastic member.

2. The damper rod mount according to claim 1, wherein each of the plurality of arm portions includes a curved portion that curves downward.

3. The damper rod mount according to claim 2, wherein the plurality of arm portions are three or four arm portions.

4. The damper rod mount according to claim 1, wherein at least one of the center portion and each of the plurality of arm portions has an opening.

5. The damper rod mount according to claim 4, wherein the plurality of arm portions are three or four arm portions.

6. The damper rod mount according to claim 1, further comprising:

a stopper provided on at least one of the upper surface and the lower surface of each of the plurality of arm portions; and a stopper receiving portion capable of contacting the stopper.

7. The damper rod mount according to claim 6, wherein the plurality of arm portions are three or four arm portions.

8. The damper rod mount according to claim 1, wherein the plurality of arm portions are three or four arm portions.

* * * * *